United States Patent [19]

Bell

[11] Patent Number: 5,061,929

[45] Date of Patent: Oct. 29, 1991

[54] DEPLOYMENT OF RADAR REFLECTORS

[75] Inventor: Stephen W. Bell, Woodbridge, United Kingdom

[73] Assignee: Firdell Multiflectors Limited, Essex, United Kingdom

[21] Appl. No.: 592,507

[22] Filed: Oct. 3, 1990

[30] Foreign Application Priority Data

May 23, 1990 [GB] United Kingdom ................. 9011471

[51] Int. Cl.[5] .................. G01S 7/36

[52] U.S. Cl. .................. 342/10

[58] Field of Search .................. 342/8, 9, 10, 12; 244/3.25, 3.29; 102/505

[56] References Cited

U.S. PATENT DOCUMENTS

| | | | |
|---|---|---|---|
| 2,721,998 | 10/1955 | Carman et al. | 343/18 |
| 3,631,505 | 12/1971 | Carman et al. | 343/915 |
| 4,195,056 | 3/1980 | Firth | 342/10 |
| 4,446,793 | 5/1984 | Gibbs | 342/12 |
| 4,482,900 | 11/1984 | Bilek et al. | 343/915 |
| 4,740,056 | 3/1988 | Bennett | 342/8 |

*Primary Examiner*—Mark Hellner

*Attorney, Agent, or Firm*—Nixon & Vanderhye

[57] ABSTRACT

A deployment system for a radar reflector comprises an outer shell (7) and a radar reflector (8). The radar reflector structure is contained within the outer shell (7) in a first substantially planar configuration. The radar reflector structure (8) is subsequently released from the outer shell (7) and adopts a second non-planar configuration.

In one example, the outer shell (7) forms part of the fin (2) of a missile.

In a second example, the outer shell (7) is a disc-shaped projectile suitable for launching from the deck of a ship.

15 Claims, 4 Drawing Sheets

DEPLOYMENT OF RADAR REFLECTORS

BACKGROUND OF THE INVENTION

Since radar was first developed it has been standard practice to deploy chaff as a countermeasure. Chaff serves either to obscure the radar beam and prevent detection of a target beyond the chaff or to deceive the user of the radar into believing there to be a target at the point at which the chaff is deployed. Over the course of time various means of deploying chaff have been developed. One widely used method involves packing the chaff tightly within the cylindrical body of a missile which carries the chaff to the point at which it is dispersed.

As radar systems have increased in discrimination so more sophisticated countermeasures have been found necessary. In particular it has been proposed to use structures such as trihedral re-entrant corner reflectors to produce a radar reflection with precisely determined characteristics. It has been proposed that such structures are associated with aircraft, ships and ground installations. It would be desirable however to be able to deploy these structures in the manner of chaff, independent of any vehicle or installation. It is not however practical to deploy these structures within missiles of the type normally used for the deployment of chaff. Although the reflector structures are commonly designed to fold flat and hence occupy a relatively small volume they still remain of far too great a size to fit within the body of a conventional chaff carrying missile. Replacing conventional deployment systems with a dedicated system using missiles with a body of sufficiently great a diameter to enclose the reflector structure would be prohibitively expensive.

SUMMARY OF THE INVENTION

According to the present invention, a reflector deployment system includes an outer shell and a radar reflector in a first substantially planar configuration located within the outer shell, the outer shell being arranged to release the reflector at the point of deployment and the reflector being arranged to adopt a second non-planar configuration once released.

The use of a radar reflector structure which folds flat and fits within an outer shell greatly facilitates deployment of the reflector. The shell protects the reflector and holds it in a non-planar configuration until the point of deployment is reached. The shell then releases the structure which automatically adopts a non-planar configuration.

Preferably the outer shell comprises a fin of a missile for use in delivering the reflector to the point of deployment.

Often the missile contains more than one radar reflector and in this case reflectors can be located in all of its fins and more than one reflector may also be located in each fin.

Typically the missile includes four fins arranged uniformly about the missile body towards its rear. These fins are often folded so that the missile fits within a tube or box launcher. To adapt conventional missiles for use in a system according to the present invention it is necessary simply to increase the extent of the fins along the length of the missile so that they have a sufficient length to contain a folded flat reflector. A system according to the present invention therefore allows rapid and accurate deployment of sophisticated trihedral re-entrant corner radar reflector structures and other types of radar reflector that are capable of folding flat using missiles of similar size and conventional missiles and using conventional missile launchers.

Preferably the fins includes a hinge line towards its inner edge and the radar reflector is located in a portion of the fin outside the hinge line.

Preferably the outer edge of the or each fin is parallel to the missile body along a rear section of the fin and inclined inwards along a forward section of the fin, the angle between the outer edge of the rear and forward sections being substantially equal to the angle between adjacent edges of the reflector in its first substantially planar configuration.

Preferably the outer portion of the fin is arranged to separate from the rest of the missile along the hinge line to deploy the radar reflector. Preferably the casing of the outer portion is arranged to detach from the radar reflector as it is deployed. Preferably a parachute, kite or balloon support system for the radar reflector is arranged to be deployed with the radar reflector. The missile may include two or more radar reflectors connected to a single support system by lines, the lengths of the lines being chosen to provide a spacing between the reflectors such that in combination they have a desired radar signature.

Alternatively the outer shell may comprise a substantially disc-shaped projectile.

This preferred aspect of the present invention is particularly suitable for deployment of a reflector from a ship. In this case preferably the system further comprises flotation means provided within the outer shell and arranged to provide a floating platform for the reflector structure once it is released from the outer shell. Preferably the system further comprises an inflatable envelope surrounding the radar reflector and arranged to inflate automatically when the radar reflector is released from the shell.

The disc-like pack is particularly suitable for launching from a platform such as a ship the disc spinning using aerodynamic and gyrodynamic forces to augment lift and maintain flight stability. In this manner a range of 200 m may be obtained. A shell projected in this manner will skip a few times on the sea. Preferably the system includes means responsive to the first impact of the shell on the water to trigger the opening of the shell and deployment of the radar reflector a predetermined time thereafter.

BRIEF DESCRIPTION OF THE DRAWINGS

A system in accordance with the present invention is now described in detail with reference to the accompanying drawings, in which.

DESCRIPTION OF A PREFERRED EXAMPLE

Figure 1:
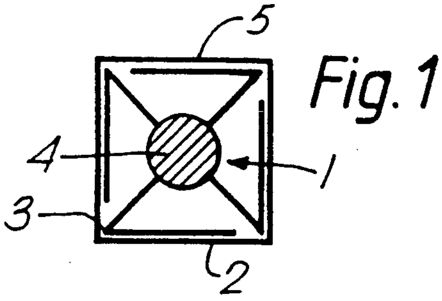
FIG. 1 is a cross section through a box launcher containing a missile.
Figure 2:
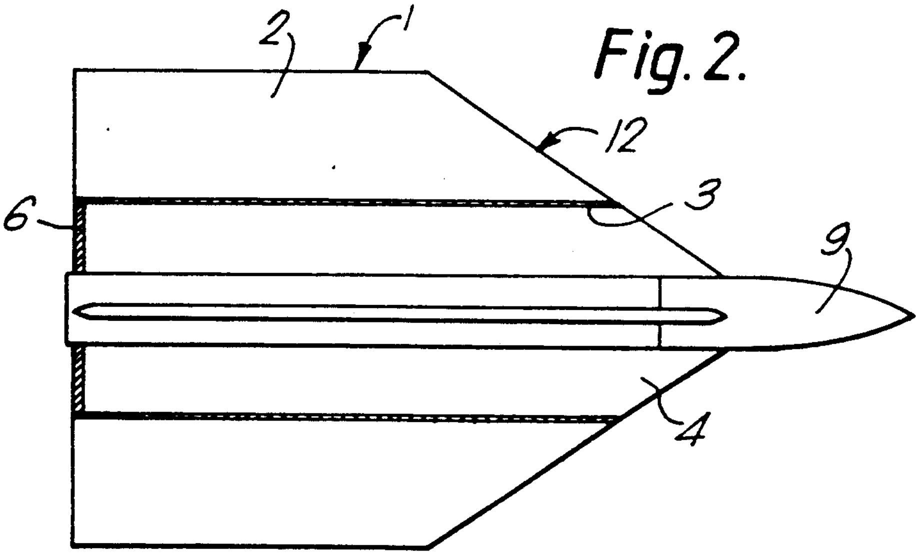
FIG. 2 is a side elevation of a missile used in a system in accordance with the present invention.
Figure 3:
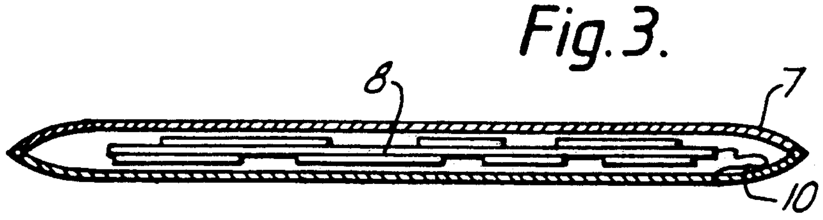
FIG. 3 is a section through a fin of a missile used in a system in accordance with the present invention (hinges are omitted for clarity)
Figure 4:
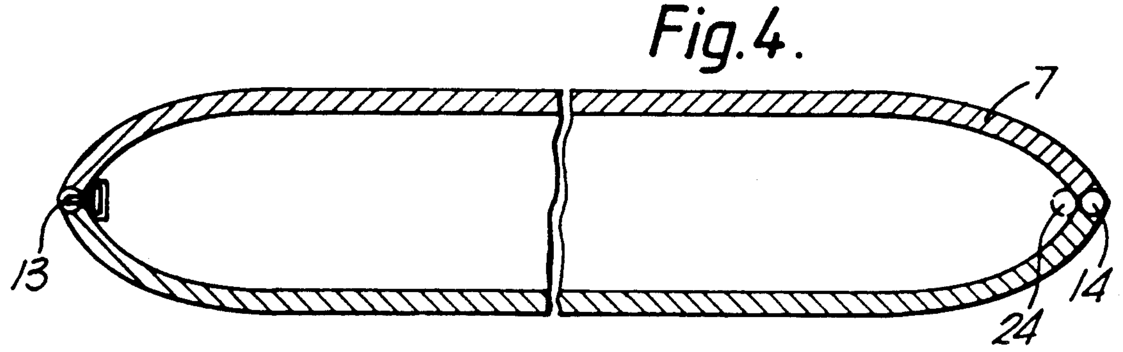
FIG. 4 is an enlarged section through the fin of FIG. 3 showing the hinges (the reflector is omitted for clarity)
Figure 5:
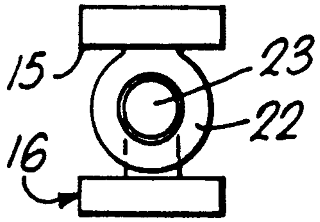
FIG. 5 is an end elevation of the latch elements used in the fin of FIG. 4.

As shown in FIG. 1 a missile 1 has four fins 2 arranged in a cruciform configuration. The fins 2 are folded about hinge lines 3 running parallel to the missile body towards the inner edge to enable the missile 1 to fit within a box launcher 5. On launch the missile 1, which may be self-powered, leaves the box launcher 5 and the fins 2 immediately fold out, adopting the configuration shown in FIG. 2. Movable aerodynamic surfaces 6 are included on the trailing edges of the fins 2 to effect course correction.

The portion of each fin 2 outside the hinge line 3 consists of a hollow casing 7 containing a radar reflector 8 held in a substantially planar configuration. The hinge at the hinge line 3 comprises a first latch element 15 integral with the portion of the fin outside the hinge line and a second latch element 16 integral with the portion of the fin inside the hinge line 3 and fixed to the missile body. The first latch element 15 carries hollow cylindrical sockets 22 and the second latch element 16 carries hinge pins 23 arranged to cooperate with the sockets 22. The hinges are arranged so that there is sufficient clearance between adjacent sockets 22 to allow the pins 23 to slide out to unlatch the casing 7. The leading and trailing edges of the fin 2 also include hinges. A hinge 13 at the trailing edge is positioned within the interior of the fin 2 and comprises latched elements 15, 16. A hinge 14 at the leading edge of the fin 2 is positioned within the thickness of the casing 7 and is a conventional fixed hinge. In an alternative embodiment the hinge 14 also comprises latch elements 15, 16 and is positioned in a region 24 within the volume of the fin 2.

There is within a forward part of the missile body 4 surrounded by an ogive shroud 9 a balloon support system comprising one or more balloons (not shown) arranged to self-inflate on being released and lines 10 linking the balloons to the radar reflectors 8. Where a distributed reflector is used with several individual reflectors 8 spaced from each other so that interference between their reflections creates a desired response pattern, such an arrangement being used for example to create "glint", then several reflectors 8 are attached to each balloon. The length of the lines 10 joining the reflectors 8 to the balloon are chosen to provide the correct spacing between the reflectors 8 to give the desired overall response.

It has been found that it can be beneficial for the performance of a reflector comprising re-entrant trihedral corners for the reflector to have a structure in which all or part is derived from a non-parallel-sided strip. When such a structure is used in a system in accordance with the present invention the angle between rear and forward sections 11, 12 of the outer edge of each fin 2 is chosen to be substantially equal to the angle between adjacent sides of the reflector 8 in its first substantially planar configuration. This serves to ensure maximum utilisation of the space within the fin 2.

The missile 1 includes a preprogrammed control system which initiates the deployment sequence once the missile 1 has reached the appropriate target area.

An acceleration sensitive switch is used to trigger deployment: 'g' switch fuzes of the type commonly used with munitions are suitable for this purpose. On reaching a predetermined level of 'g', which may be determined experimentally for a given deployment system, an explosive train or solenoid is initiated to burst a diaphragm to release $CO_2$ gas from a cannister stored with the reflector in the fin. The resulting gas pressure forces apart the casing of the fin.

The firing of the fuze is effective to jettison the ogive shroud 9 from the front of the missile body 4 and to separate the outer portion of each fin 2 from the rest of the fin 2 along the hinge line 3. The fin case surfaces 7 are arranged to fall freely away once the fins 2 have left the missile 1, allowing the release of the radar reflector 8 and the associated balloon support system. Silicone rubber springs fixed between the surfaces of the reflector 8 cause the reflector to adopt its second, non-planar configuration once it is free of the fin 2.

Figure 6:
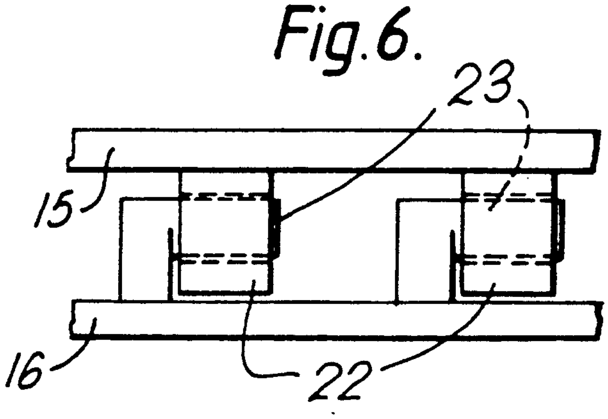
FIG. 6 is a partial side elevation of latch elements used in the fin of FIG. 4.
Figure 7:
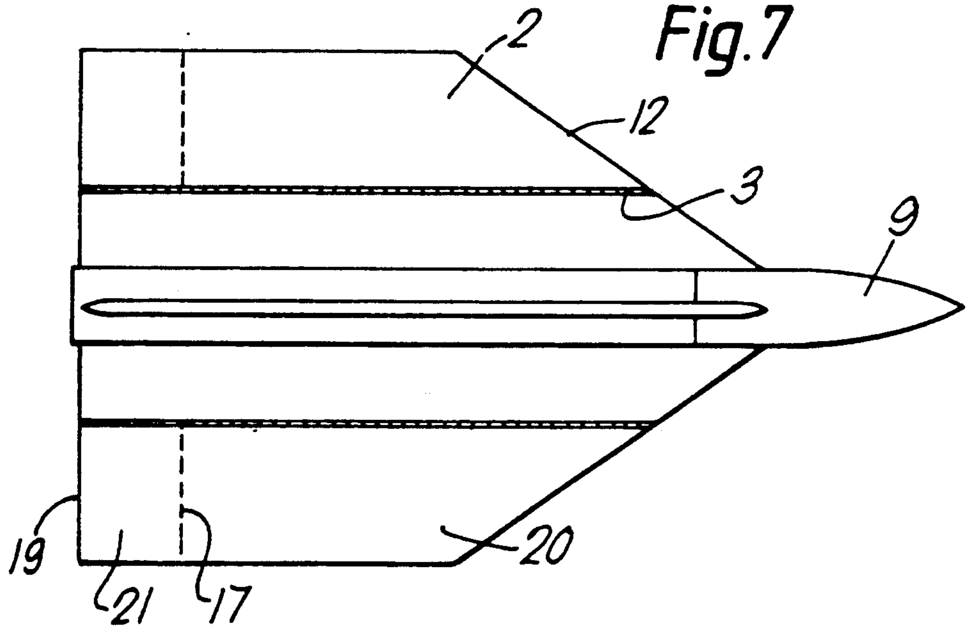
FIG. 7 is a side elevation of an alternative embodiment of a missile used in a system in accordance with the present invention.
Figure 8:
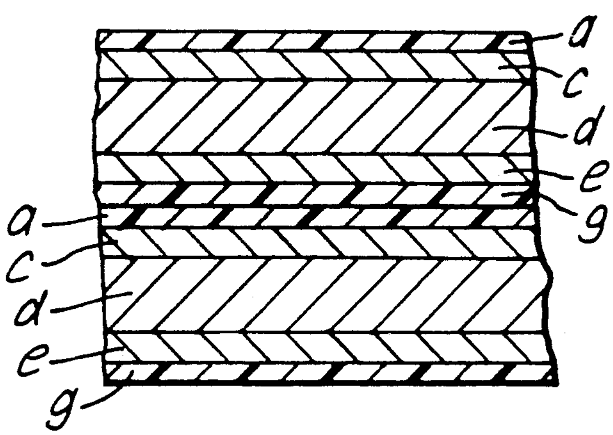
FIG. 8 is a cross section through part of a radar reflector.

On deployment of the reflector structure 8 it is probable that the missile 1 will be travelling at high speed. This speed may be such as to produce forces which are unacceptably high for certain types of reflector structures. In an alternative embodiment of the present invention part of the casing 7 of the fin 2 is arranged to act as an air brake as it opens to deploy the radar reflector 8 and hence the speed at which the reflector 8 is deployed is reduced. FIG. 6 shows the configuration of the fin 2 in this alternative embodiment. A further hinge line 17 is positioned towards the trailing edge of the fin 2 extending between the hinge line 3 and the rear outer edge 11 of the fin 2. The hinge of the hinge line 17 comprises latch elements 15, 16. A fixed hinge 19 running parallel to the hinge line 17 is formed on the trailing edge of the fin 2. In response to the command to deploy the reflector the ogive shroud 9 is jettisoned together with forward fin cases 20 via the release of the latch elements 15, 16 along the hinge lines 3, 17. A rear fin case 21 however remains fixed by the fixed hinge 19 and opens to a preset angle. The rear fin case 21 acts as an airbrake, generating increased drag and therefore reducing the speed at which the reflector 8 is deployed.

As an alternative method of slowing the missile 1 before deployment of the reflector 8 one or more drogue parachutes (not shown) may be arranged to be released from the rear portion of the fin 2 as the casing 7 is unlatched.

A suitable reflector structure for deployment in a fin of the type discussed above is disclosed in the present applicants earlier British application, GB-A-2216725. This structure is formed from a number of trihedral re-entrant corner reflectors, each re-entrant corner being formed from two adjacent plates and a separator plate extending between adjacent plates in the plane normal to those plates. The hinges between the elements of the reflector are preferably provided by a thin flexible layer formed integrally with the reflector elements and extending across adjacent elements. The reflector elements may be formed from PCB laminates. In the example shown in FIG. 10, the individual reflector elements are generally trapezoidal in shape with one end radiussed. Each element is formed from a pair of laminates, with the opposing inner surface of those laminates bonded together. The outer surfaces of the laminates are covered by a thin polyester or polyimide film. Polyimide is the more expensive material but is preferred for applications where its higher strength tear-resistance, and better high temperature properties are required.

Figure 10:
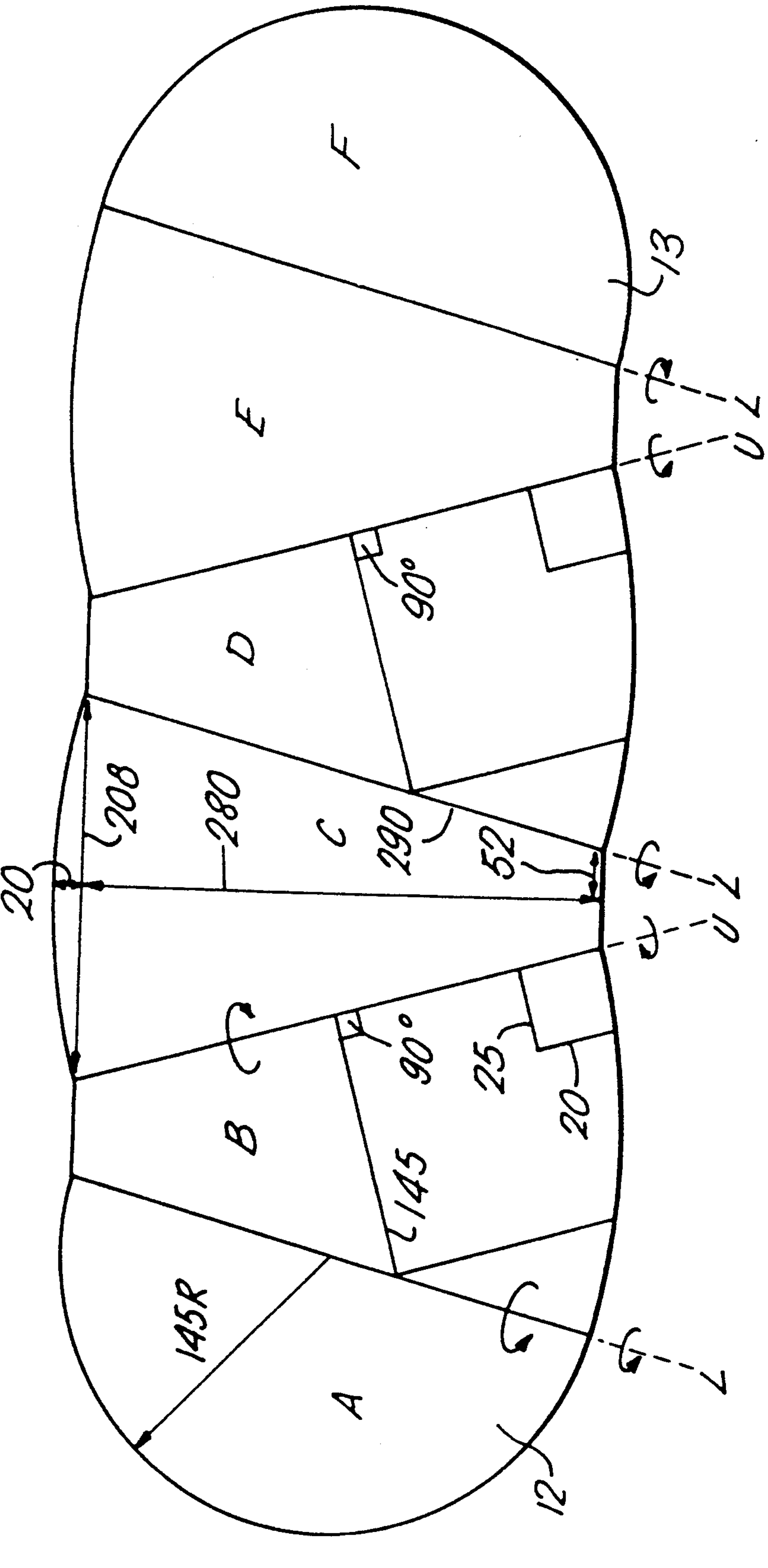
FIG. 10 is a plan of a radar reflector suitable for use with the projectile of FIG. 9.

Tables 1 and 2 describe the composition of two alternative laminate structures. The first structure described in Table 1 uses a PCB laminate having a polyester core coated with copper on both sides. After the PCB laminates have been cut to the desired trapezoidal shape and bonded together on their inner surfaces they are assembled into the required configuration shown in FIG. 2. A thin flexible layer, which in this first example is a polyester film of 0.125 mm thickness, is then bonded to the elements in a plate press so that the film layer extends across adjacent trapezoidal elements and provides a hinge where those elements meet. In the presently preferred embodiment the polyester film is applied to both the upper and lower surfaces of the dual laminate structure. Initially when the dual laminate structure leaves the press in which it is formed it has films extending continuously across both its uppermost and lowermost surfaces. Where a hinge is required on the upper surface between two elements then the film on the lower surface between the two elements is slit leaving the film on the upper surface intact. Conversely where the hinge is required on the lower surface then the film on the upper surface is slit. As shown in FIG. 10, along the length of the reflector structure the hinges are formed alternately on the upper and on the lower surfaces. Oxidation of the copper surface or acid etching can be used to enhance bond strength.

Table 2 lists the elements of a dual laminate structure using an aluminium honeycomb core of 10 mm thickness faced with an aluminium layer of 2.0 mm thickness. A plastics film is bonded to the laminate structure in the same manner as described above for the first example. In this example however the plastics film is polyimide of 0.5 mm thickness, in order to provide improved strength and tear-resistance. Polyester (e.g. Terylene or Dacron) or Kevlar sailcloth may be used alternatively.

In FIG. 10 hinge lines lying in the plane of the lowermost surface are indicated by L, and those lying in the plane of the uppermost surface by U. To configure the reflector for use, the separator plates are folded up about the film hinge to lie at an angle of substantially 90° to the plane of their respective trapezoidal elements. The trapezoidal elements are then folded in the directions indicated by the arrows in FIG. 10 until the edge of the separator plate normal to its hinge abuts the surface of the adjacent element.

Figure 9A:
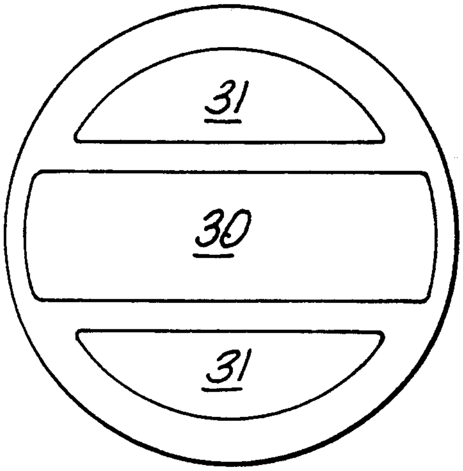
FIG. 9 is a plan of a disc-shaped projectile.
Figure 9B:
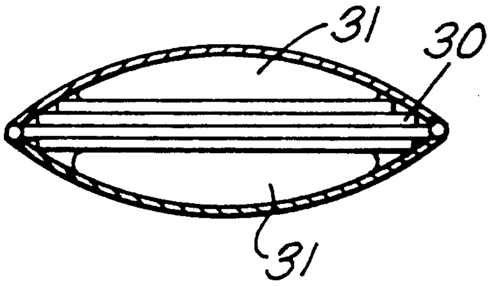

The reflector structure shown in FIG. 10 folds flat concertina wise into a substantially disc-like shape. It is therefore particularly suitable for use for deployment in a disc-shaped projectile. Alternatively a number of reflectors, such as those disclosed in GB-A-2216725, which fold flat in an extended configuration, may be deployed using such a projectile. FIGS. 9A and 9B are a plan and cross section of such a projectile. In cross section it is generally similar to the fin shown in FIGS. 3 to 6 and uses an identical hinge arrangement. A stack of four extended flat reflectors 30 are positioned centrally within the shell, with flotation gear and the associated control mechanism 31 located on either side. The control mechanism for opening the case and inflating the flotation system is generally similar to that described above for the missile fins. A timer may be used in conjunction with an acceleration sensitive fuze to delay deployment until a predetermined time after the disc strikes the water. According to the particular field of use the size of the disc may vary from that of the missile fins discussed above, typically 30×30×3 cm, to several meters diameter. Where necessary it may be made very large, e.g. 5 meters in diameter and 30 cm thick, in which case several reflector structures may be provided within each projectile. This form of projectile is intended for rapid deployment as a decoy target from a ship. The disc-pack is typically stored near deck level at the edge of the ship with the plane of the disc horizontal. On the command for deployment, the disc-pack is catapulted from the ship with the disc spinning frisbee-like. It is preferably projected for a range of 200 m so that its radar signature is separate from the ship, without it being apparent that it is a projectile ejected from it.

On hitting the sea surface the disc skips. A pre-set time after the first skip the case is opened in the same manner as described as above for the missile fin. Instead of a parachute/balloon suspension system a flotation system is used. The flotation system is generally similar to that used for inflatable life rafts using automatic $CO_2$ gas inflation of a plurality of chambers with appendages being water-filled ballast chambers, a drogue etc. The radar-reflective structure self-erects above the flotation platform in a preselected orientation. It may optionally include an inflated "sausage" envelope for protection in high seas and wind. The envelope must he formed of a non-woven material rather than a woven fabric, because salt water can lodge in the interstices and degrade reflective performance. For some uses, a single flotation platform will be adequate. To cope with more advanced missile systems discrimination capabilities, more units may be required, say three or four, on one or more flotation platforms. A plurality of reflectors with connected flotation platforms may be included in a single disc-pack and if needs by several disc-packs may be deployed at once.

For airborne applications, the mean radar cross section of individual reflective units will be in the range 1 to 100 $m^2$. For sea surface deployment individual mean RCS figures will be in the range 100 to 10,000 $m^2$. The number of units deployed is chosen to be such as combined to form peak and mean RCS levels appropriate to the target it is intended to replicate.

The radar frequency assumed for the numerical examples is 10 GHz. Sizes of reflective structure will require adjustment if different frequencies are used by the threat radars. The structures may readily be adapted to different frequencies of operation required. All structures, being passive respond to other radar frequencies in exactly the same manner as real targets, thereby enhancing their credibility.

TABLE 1

| | | |
|---|---|---|
| a | polyester | 0.125 mm |
| b | polyester adhesive | |
| c | copper | 0.03 mm |
| d | polyester core | 2 mm |
| e | copper | 0.03 mm |
| f | polyester adhesive | |
| g | polyester | 0.125 mm |
| h | polyester adhesive [repeat a–g] | |

TABLE 2

| | | |
|---|---|---|
| a | polyimide | 0.5 mm |
| b | polyimide adhesive | |
| c | aluminium | 2.0 mm |

TABLE 2-continued

| | | |
|---|---|---|
| d | aluminium honeycomb | 10 mm |
| e | aluminium | 2.0 mm |
| f | polyimide adhesive | |
| g | polyimide | 0.5 mm |
| h | polyimide adhesive | |
| | [repeat a-g] | |

I claim:

1. A radar reflector deployment system comprising:
an outer shell;
a radar reflector comprised of a plurality of substantially rigid members in a first substantially planar configuration located within said outer shell;
means for releasing said radar reflector from said outer shell at a point of deployment; and
means for configuring said radar reflector in a second, non-planar configuration once released.

2. The system of to claim 1, wherein said outer shell comprises a fin of a missile for use in delivering the reflector to said point of deployment.

3. The system of claim 2, wherein said missile comprises a plurality of fins, each of said fins comprising an outer shell containing a radar reflector structure.

4. The system of claim 2, wherein said fin includes a hinge line towards its inner edge and said radar reflector is located in a portion of said fin outside said hinge line.

5. The system of claim 2, wherein an outer edge of said fin is parallel to said missile body along a rear section of said fin and inclined inwards along a forward section of said fin, the angle between said outer edge of rear and forward sections being substantially equal to the angle between adjacent edges of said radar reflector in said first, substantially planar, configuration.

6. The system of claim 4, wherein said portion of said fin is arranged to separate from the rest of said missile along said hinge line thereby deploying said radar reflector and casing of said outer portion is arranged to detach from said radar reflector as it is deployed.

7. The system of claim 2, further comprising means for supporting said radar reflector arranged to be deployed. with said radar reflector.

8. The system of claim 7, wherein said means for supporting comprise a kite attached to said radar reflector.

9. The system of claim 7, wherein said means for supporting comprise a balloon attached to said radar reflector.

10. The system of claim 7, wherein said means for supporting comprise a parachute attached to said radar reflector.

11. The system of claim 1, wherein said outer shell comprises a substantially disc-shaped projectile.

12. The system of claim 11, further comprising means located within said outer shell for providing a floating platform for said radar reflector once released from said outer shell.

13. The system of claim 12, further comprising means responsive to a first impact of said outer shell on water for triggering opening of said shell and deployment of said radar reflector a predetermined time thereafter.

14. The system of claim 13, further comprising an inflatable envelope surrounding said radar reflector and arranged to inflate automatically when said radar reflector is released from said outer shell.

15. A method of deploying a radar reflector comprising loading a radar reflector having a plurality of substantially rigid members in a first substantially planar configuration within a substantially disc-shaped projectile, projecting said projectile from a launch-point to a point of deployment distant from said launch-point, and at said point of deployment releasing said radar reflector from said projectile and automatically configuring said radar reflector in a second non-planar configuration.

* * * * *